US008177182B1

(12) United States Patent
Wood et al.

(10) Patent No.: US 8,177,182 B1
(45) Date of Patent: May 15, 2012

(54) WIRELESS REMOTE CONTROL DEVICE FOR A PORTABLE MEDIA DEVICE

(75) Inventors: Policarpo Wood, San Jose, CA (US); Anton Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/986,956

(22) Filed: Jan. 7, 2011

(51) Int. Cl.
*A47G 1/10* (2006.01)

(52) U.S. Cl. .................................. 248/316.1; 248/230.2

(58) Field of Classification Search ............... 248/316.1, 248/316.5, 229.11, 229.13, 229.21, 229.23, 248/230.2, 230.4
See application file for complete search history.

(56) References Cited

U.S. PATENT DOCUMENTS

| 5,096,150 | A | * | 3/1992 | Westwood | ............... | 248/231.51 |
|---|---|---|---|---|---|---|
| 2002/0171559 | A1 | | 11/2002 | Yang | | |
| 2005/0001821 | A1 | * | 1/2005 | Low | .............................. | 345/169 |
| 2006/0071917 | A1 | * | 4/2006 | Gomez et al. | .................. | 345/184 |
| 2007/0242060 | A1 | * | 10/2007 | Cheah | ............................ | 345/184 |
| 2008/0065246 | A1 | | 3/2008 | Zorkendorfer et al. | | |
| 2008/0244144 | A1 | | 10/2008 | Choi | | |
| 2009/0059512 | A1 | | 3/2009 | Lydon et al. | | |
| 2009/0085875 | A1 | * | 4/2009 | Inoue et al. | .................... | 345/171 |
| 2009/0143060 | A1 | | 6/2009 | Grushkevich et al. | | |
| 2009/0179854 | A1 | * | 7/2009 | Weber et al. | .................. | 345/156 |
| 2009/0198355 | A1 | | 8/2009 | Powell | | |
| 2010/0060568 | A1 | * | 3/2010 | Fisher et al. | ................. | 345/156 |

FOREIGN PATENT DOCUMENTS

DE            4321917 A1    1/1995

* cited by examiner

*Primary Examiner* — Ramon Ramirez
(74) *Attorney, Agent, or Firm* — Kilpatrick Townsend & Stockton LLP

(57) ABSTRACT

A wireless remote control device for a portable media device can include a touch-sensitive faceplate and a base section coupled to the faceplate such that the faceplate is rotatable relative to the base section. The base section can house electronic circuitry including a wireless transmitter that transmits signals to portable media device in response to a user touching the faceplate. Clamping feet can be attached to the base section, e.g., using hinges so that the wireless remote control device can be mountable on a vehicle steering wheel. The hinges can be movable in a lateral direction to vary the pitch between the clamping feet to accommodate various thicknesses of steering wheels. The clamping feet can be movable in an arcuate motion in order to clamp to or unclamp from the steering wheel.

19 Claims, 8 Drawing Sheets

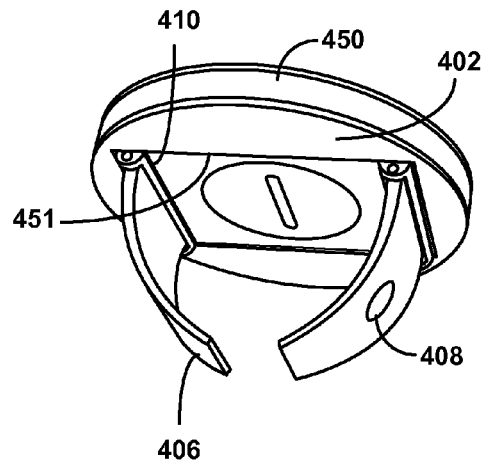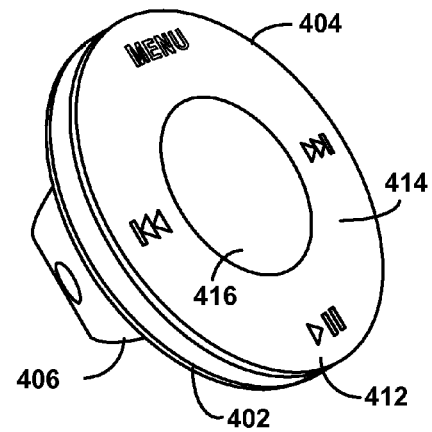
FIG. 4A        FIG. 4B
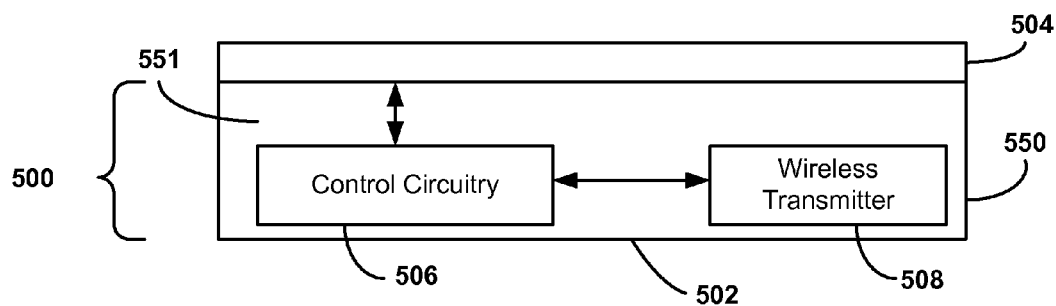
FIG. 5

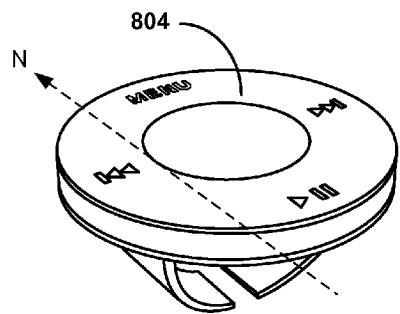
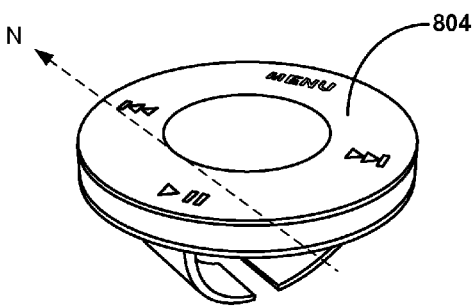
FIG. 8A    FIG. 8B
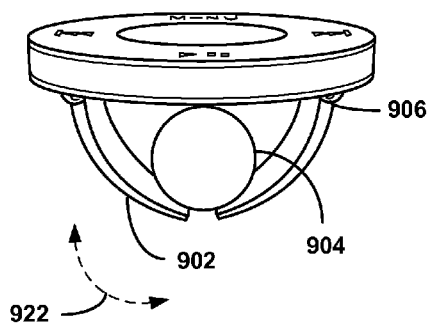
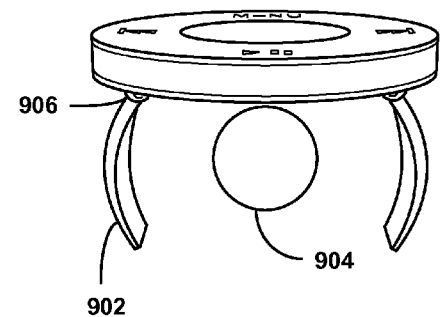
FIG. 9A    FIG. 9B

WIRELESS REMOTE CONTROL DEVICE
FOR A PORTABLE MEDIA DEVICE

BACKGROUND

The present disclosure relates in general to wireless user interface devices and in particular to a wireless remote control device.

Portable media devices have become ubiquitous. Several types of portable media devices are manufactured by various manufacturers. For example, Apple Inc. manufactures the iPod®, iPhone®, and iPad® series of portable media devices.

With the growing popularity of portable media devices, various accessories are also being sold that interface with these portable media devices to provide addition functionality or convenience to a user for operating the portable media devices. One of the popular accessories currently being offered is an in-vehicle entertainment system that is configured to interface with a portable media device and allow the user/driver to control the portable media device using the controls of the in-vehicle entertainment system. Some in-vehicle entertainment systems do not include the control functionality but rather only output information provided by the portable media player. In such in-vehicle entertainment systems, the user has to control the portable media player using the controls on the portable media player itself.

In both types of in-vehicle entertainment systems discussed above, the user (driver) has to take his eyes off the road in order to manipulate either the in-vehicle entertainment system controls or the controls on the portable media player. Such distraction can be dangerous and can lead to accidents.

SUMMARY

Embodiments of the present invention are related generally to remote controls. More specifically, certain embodiments of the present invention provide a steering wheel mountable wireless remote control for controlling a portable media player.

Embodiments of the present invention provide a wireless remote control device configured to control a portable media device (PMD). The remote control device can include a base section. The base section can include electronic circuitry for controlling operations of the remote control device. For example, the electronic circuitry can detect an input from a user, interpret the input to detect a desired operation by the user, and transmit an appropriate signal to the PMD for performing the desired operation. The remote control device can also include a faceplate that is rotatably mounted on top of the base section. The faceplate can rotate in a 360 degree angle or more relative to the base section. The faceplate can rotate about an axis that is orthogonal to the center of a plane occupied by the faceplate. In some embodiments, the faceplate can be touch-sensitive.

The base section can have one or more clamping feet mounted to a bottom surface of the base section. The clamping feet can be mounted to the base section, e.g., using hinges. The clamping feet can be movable in various directions. In some embodiments, the clamping feet can be moved laterally towards and away from each other along the bottom surface of the base section, e.g., by moving the hinges. The lateral motion can enable the clamping feet to accommodate steering wheels having different thicknesses. The clamping feet can also move in an arcuate orientation such that the ends of the clamping feet not attached to the base section can move closer or farther from each other. The arcuate motion can result in the remote control device clamping on to or unclamping from a steering wheel.

In some embodiments, the wireless remote control device can communicate with the PMD using the Bluetooth protocol. In some embodiments, the faceplate can include markings to aid the user in navigating the various screens of the PMD. The markings can be associated with specific control functions that can result in specific information being transmitted to the PMD. In some embodiments, the remote control device can also be wearable on a person when not mounted on the steering wheel. In some embodiments, the remote control device can provide all or a subset of the functionality available via the user operable controls on the PMD and can mime or replicate the layout of controls on the PMD.

The following detailed description, together with the accompanying drawings will provide a better understanding of the nature and advantages of the present invention.

BRIEF DESCRIPTION OF THE DRAWINGS

FIGS. 4A and 4B illustrate a remote control device according to an embodiment of the present invention.

FIG. 5 is a cross-sectional view of a remote control device according to an embodiment of the present invention.

FIGS. 8A and 8B illustrate positioning of a rotating faceplate on the remote control device according to an embodiment of the present invention.

FIGS. 9A and 9B illustrate motion of the clamping feet of the remote control device according to an embodiment of the present invention.

DETAILED DESCRIPTION

Embodiments of the present invention relate generally to a remote control device for a portable media device. Specifically, certain embodiments of the present invention provide a wireless remote control that is mountable on the steering wheel of a vehicle.

In some embodiments, the remote control device can include a base section. The base section can further include a wireless transmitter and other control circuitry for operation of the remote control device. A touch-sensitive faceplate can be coupled to a top surface of the base section. The touch-sensitive faceplate can be coupled to the base section such that the touch-sensitive faceplate can rotate in a 360 degree angle or more with respect to the base section. "Touch-sensitive" in this context means that a user can interact with the remote control device by touching an area on the surface of the faceplate with a finger, pencil, or other object, e.g., a stylus.

The remote control device can further have one or more clamping feet attached to a bottom surface of the base section. The clamping feet can be attached to the bottom section via hinges. The hinges can be movable in a lateral direction along the bottom surface of the base section. The lateral movement of the hinges can be used to vary the pitch between the clamping feet. The clamping feet can also be moved in an arcuate orientation so that they can grip a steering wheel when in a clamping position and release the grip on the steering wheel in an unclamped position. In some embodiments, the remote control device can also include a clamping mechanism that can include an actuator and a drive mechanism for moving the clamping feet. In some embodiments, the actuator can be a button disposed on one more of the clamping feet. The drive mechanism can either be electrically powered or mechanical only. The actuator can be coupled to the drive mechanism for performing the clamping and unclamping operation.

Figure 1A:
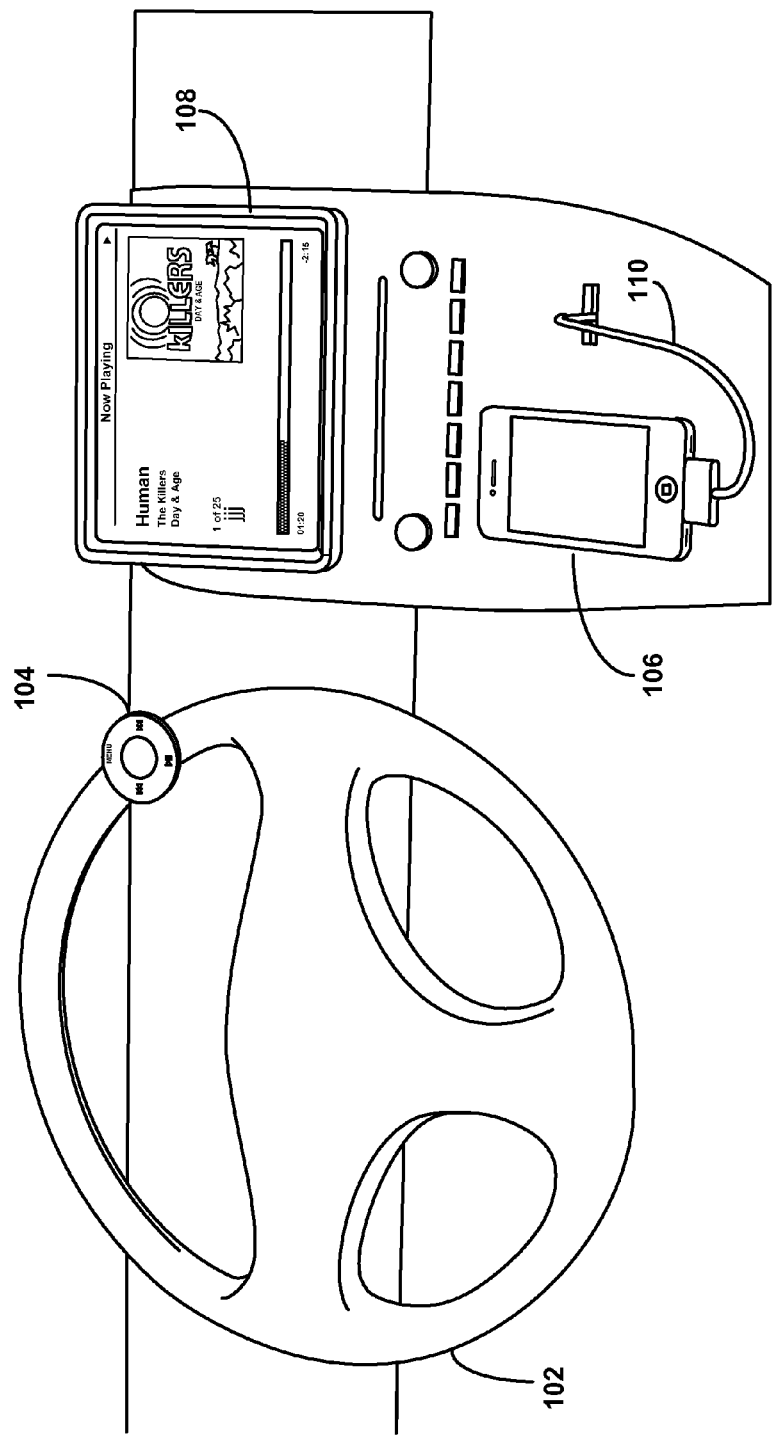
FIGS. 1A and 1B illustrate a wireless remote control device mounted to a vehicle steering wheel according to an embodiment of the present invention.

FIG. 1A illustrates a remote control device mounted to a steering wheel of a vehicle according to an embodiment of the present invention. As shown in FIG. 1A, a remote control device 104 can be mounted to a steering wheel 102 of a vehicle. Remote control device 104 can be configured to control a portable media device (PMD) 106 that may be communicably coupled to an accessory 108, e.g., via cable 110. Remote control 104 can be used to control operation of PMD 106 without the user having to interact directly with PMD 106 or accessory 108.

Accessory 108 can be an in-vehicle entertainment system, a stereo system, a portable video system, or the like. In this description, an in-vehicle entertainment system is used for ease of explanation. PMD 106 can be any portable electronic device capable of playing any type of media such as audio, video, text, graphics, etc.

Remote control device 104 can control the operation of PMD 106. It is to be noted that PMD 106 can also be controlled using the controls of PMD 106 and/or the controls of accessory 108. In some embodiments, the controls of PMD 106 can be disabled after it is connected to accessory 108. A user/driver of the vehicle can easily manipulate remote control device 104 in order to control PMD 106 without having to take his eyes off the road.

In operation, a user can manipulate the controls on remote control device 104 to send a command via a wireless communication channel to PMD 106. PMD 106 can then execute the command. The results of the command execution can be visible on the screen of accessory 108. For instance, PMD 106 may send a video signal to accessory 108 via cable 110 after executing the command. In some embodiments, PMD 106 can send an audio signal to accessory 108 via cable 110. The audio can be output via the vehicles speakers.

Figure 1B:
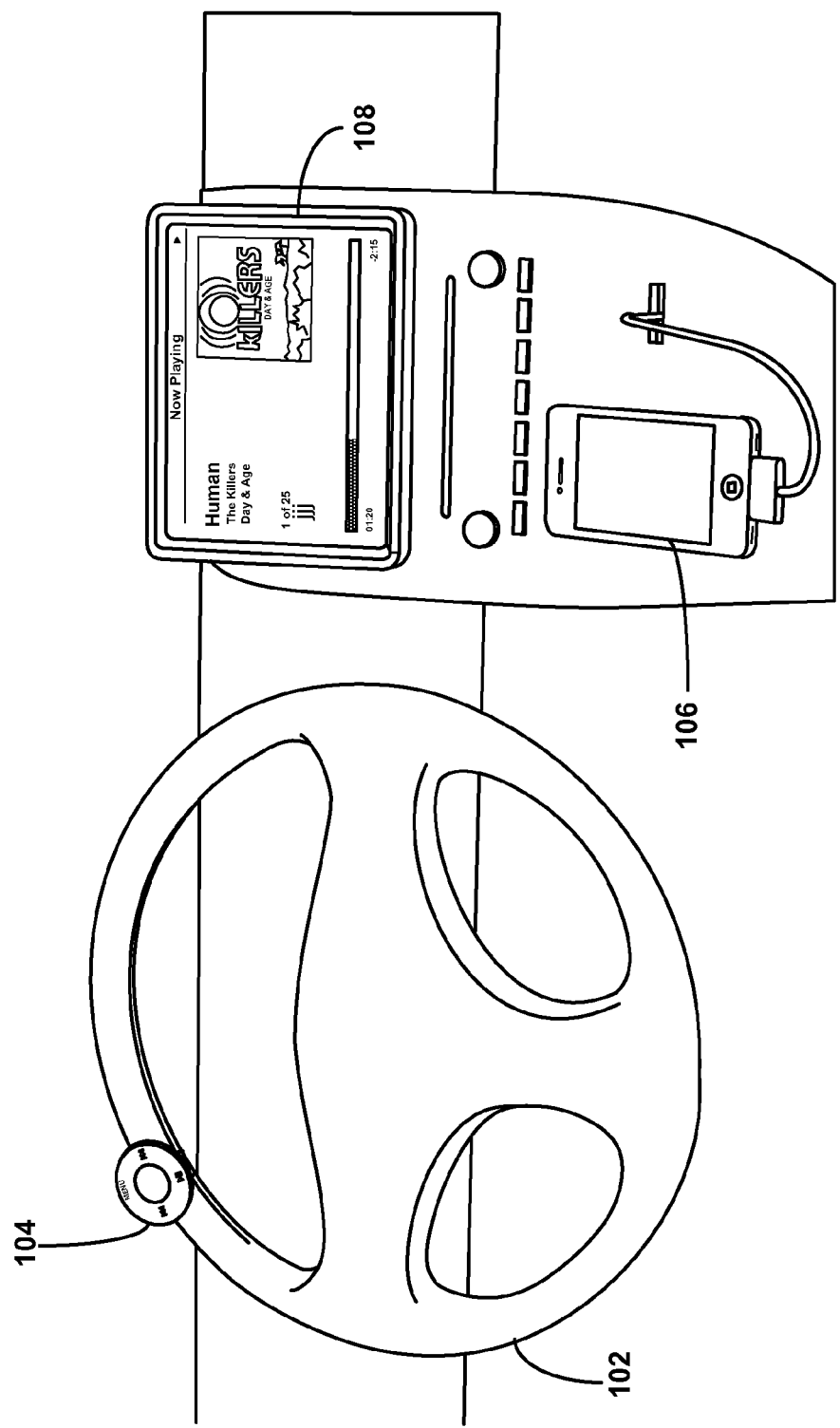

FIG. 1B illustrates remote control device 104 placed in a different location on steering wheel 102 than the location illustrated in FIG. 1A. Remote control device 104 can be placed in any location on steering wheel 102. Based on the location of remote control device 104 on steering wheel 102, the faceplate of remote control device 104 can be rotated to a desired orientation that is convenient for the user.

Figure 2:
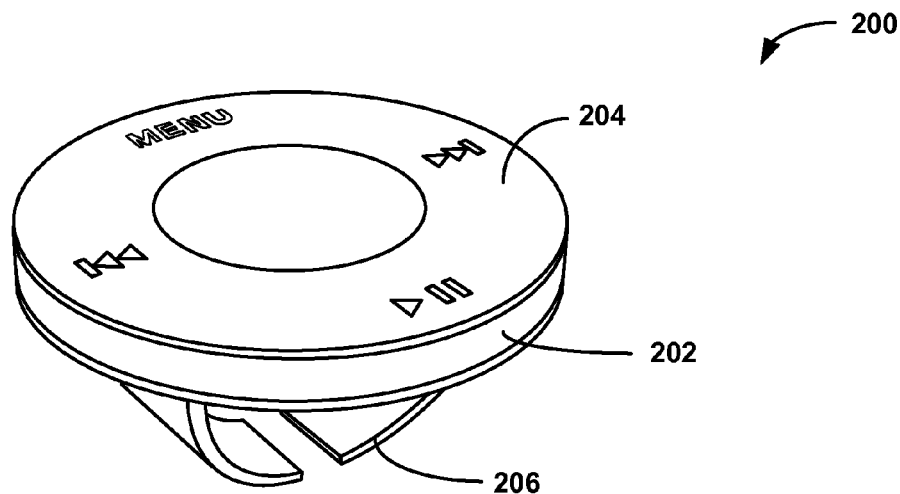
FIG. 2 illustrates a remote control device according to an embodiment of the present invention.

FIG. 2 illustrates a remote control device 200 according to an embodiment of the present invention. Remote control device 200 can include a base section 202, a faceplate 204, and one or more clamping feet 206. In some embodiments, base section 202 can include electronic circuitry for controlling the operation of the remote control device. The electronic circuitry can include control circuitry to receive and interpret the user input received via the faceplate and a wireless transmitter to transmit a signal to the portable media device. For example, the electronic circuitry included in base section 202 can convert information, e.g., a sense signal indicative of a user input, received from faceplate 204 to an appropriate command signal for transmission to the PMD. Details of base section 202, faceplate 204, and clamping feet 206 are provided below.

Figure 3:
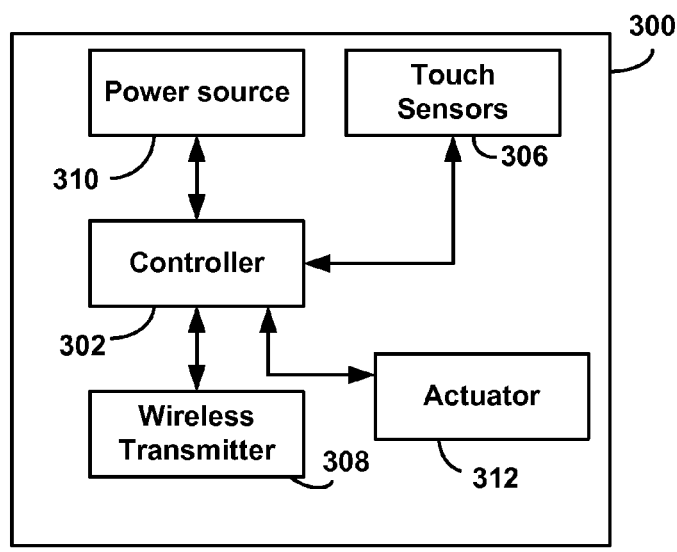
FIG. 3 is a functional block diagram of a remote control device according to an embodiment of the present invention.

FIG. 3 is a functional block diagram of a remote control device 300 according to an embodiment of the present invention. Remote control device 300 can include a controller 302, touch sensors 306, a wireless transmitter 308, a power source 310, and an actuator 312.

Controller 302, which can be implemented as one or more integrated circuits (e.g., a conventional microprocessor or microcontroller), and associated circuitry can control the operation of remote control device 300. For example, controller 302 can manage the communications between remote control device 300 and a PMD. In some embodiments, controller 302 can be part of control circuitry designed to control the operation of remote control device 300.

Touch sensors 306 can detect and measure contact force at a defined point on the faceplate. Touch sensors 306 can be configured to detect the spatial distribution of forces perpendicular to a predetermined sensory area on the faceplate. Touch sensor 306 can translate the user's tactile input to a signal and send the signal to controller 302 for subsequent interpretation and processing. In some embodiments, touch sensor 306 can be integrated into the faceplate of remote control device 300. Multiple touch sensors can be associated with a sensory area on the faceplate. In some embodiments, a sensor arrangement including one or more touch sensors (not shown) can be coupled to the faceplate. The touch sensors can be configured to detect contact of an object such as a finger as well as the location and pressure being exerted on the surface of faceplate by the finger or other object. In some embodiments, the touch sensors can have a sensing mechanism based on capacitive sensing, resistive sensing, surface acoustic wave sensing, and/or the like. The touch sensors can also be based on pressure sensing such as strain gauges, force sensitive resistors, load cells, pressure plates, piezoelectric transducers or the like. In some embodiments, the sensor arrangement can be located in specific area of faceplate in order to form distinct buttons on the surface of faceplate. For example, markings 412 of FIGS. 4A and 4B below can coincide with such buttons.

Touch sensors 306 can be electrically coupled to controller 302 so that a tactile input received by the faceplate can be transmitted to controller 302 for interpretation and further processing. In some embodiments, touch sensors 306 can process multiple simultaneous touch points, including processing data related to the pressure, degree, and/or position of each touch point. Such processing can facilitate gestures and interactions with multiple fingers, chording, and other interactions.

Wireless transmitter 308 can receive input from controller 302 and communicate a signal to the PMD. The signal can include information about the control on the remote control device that was operated. Upon receiving the information, the PMD can analyze the information to determine which control was operated and perform an action associated with that control. Wireless transmitter 308 can be implemented as any one of a Bluetooth transmitter, any other radio frequency (RF) transmitter, or an infrared (IR) transmitter. Any other suitable wireless transmitter may also be used.

Power source 310 can provide power to all the components of remote control device 300. In addition, in some embodiments, power source 310 can also provide power to a drive mechanism for moving the clamping feet during clamping and unclamping operations. In some embodiments, power source 310 can be a battery, although any other suitable power source may be used.

Actuator 312 can be implemented as a button, a switch, a dial, or any other user operable control. Actuator 312 can work in conjunction with the drive mechanism to perform the clamping and unclamping operations. In operation, a user can activate actuator 312, which can send a signal to the drive mechanism for operating the clamping feet.

It is to be noted that remote control device 300 described above is illustrative and can be modified. For example, remote control device 300 can have any type of user-operable control, e.g., buttons, switches, dials, in addition to or instead of a touch sensor.

Further, while the remote control device is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

In one set of embodiments, the PMD and the remote control device can communicate by exchanging commands and data according to an accessory communication protocol. According to one aspect, the accessory communication protocol can define a format for messages transmitted between the PMD and the remote control device. For instance, the accessory communication protocol can specify that each message is sent in a packet with a header and an optional payload. The header can provide basic information such as a start indicator, length of the packet, and a command to be processed by the recipient. The payload can provide data associated with the command. In some embodiments, the amount of associated data can be different for different commands, and some commands can provide for variable-length payloads.

In some embodiments, the accessory communication protocol can include a "general" lingo that enables certain core communication functions between the PMD and the remote control device. The general lingo can include commands enabling the PMD and the remote control device to identify themselves to each other and to provide general information about their respective capabilities, including which interfaces each supports. The general lingo can also include authentication commands that the PMD can use to verify the purported identity and capabilities of the remote control accessory (or vice versa), and the remote control device can be blocked from being operational if the authentication is unsuccessful.

As described above, the remote control device includes a wireless transmitter for communicating with the PMD. For instance, the remote control device can communicate with the PMD using Bluetooth signals. In some embodiments, an accessory communication protocol command can be encapsulated in a Bluetooth packet before being communicated to the PMD. The PMD can then parse the Bluetooth packet and extract the accessory communication protocol command and perform an action specified by the command.

As described above, the remote control device includes a base section, a faceplate, and one or more clamping feet. The following description details the mechanical aspects of the remote control device.

FIGS. 4A and 4B illustrate a remote control device 400 according to an embodiment of the present invention. The remote control device can include a base section 402, a faceplate 404, and one or more clamping feet 406.

Base section 402 can be of any shape, e.g., circular, oval, rectangular, square, etc. In some embodiments, base section 402 can have a housing that defines a chamber having a certain depth. The housing can include a peripheral structure 450, e.g., a wall, that has a certain height. In some embodiments, the depth of the chamber can be equal to the height of peripheral structure 450. Base section 402 can have a top surface and an opposing bottom surface. In some embodiments, the housing of base section 402 can enclose a control circuitry and a wireless transmitter (not shown) configured to transmit signals to a PMD, as discussed above. In some embodiments, the housing of base section 402 can be made of a suitable metal such as aluminum; any other suitable material like plastic, composite materials, glass, etc. can also be used.

FIG. 5 is a cross-section view of a remote control device illustrating base section 500 and faceplate 504 according to an embodiment of the present invention. The clamping feet are not shown in this view for purpose of clarity. Base section 500 can include a back face 502. Peripheral structure 550 that has a certain height can be attached to back face 502. Peripheral structure 550 and back face 502 together can define a chamber 551 that can house control circuitry 506 (e.g., controller 302 of FIG. 3) and the wireless transmitter 508 (e.g., wireless transmitter 308 of FIG. 3). Faceplate 504 can be rotatably coupled on top of the base section such that faceplate 504 can be in electrical communication with control circuitry 506 and wireless transmitter 508 at all times.

Figure 6:
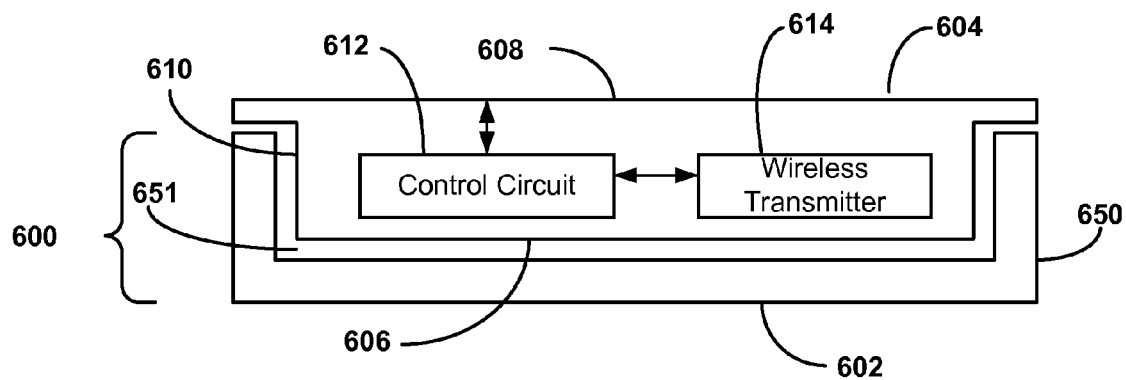
FIG. 6 is a cross-sectional view of a remote control device according to another embodiment of the present invention.

FIG. 6 illustrates a cross sectional view of a remote control device according to another embodiment of the present invention. The clamping feet are not shown in this view for purpose of clarity. In this embodiment, base section 600 can include a back face 602 and retaining structures 650 attached to back face 602. Back face 602 and retaining structures 650 together can define an opening 651. A faceplate unit 604 can be removably disposed in opening 651. In some embodiments, faceplate unit 604 can include a base plate 606 and a peripheral structure 610 having a certain height. A faceplate 608 can be coupled to peripheral structure 610 forming an enclosure. Control circuitry 612 (e.g., controller 302 of FIG. 3) and wireless transmitter 614 (e.g., wireless transmitter 308 of FIG. 3) can be disposed in the enclosure. Faceplate unit 604 can be freely rotated within opening 651. In some embodiments, faceplate unit 604 can be rotatable about an axis that is orthogonal to a center of the plane occupied by faceplate 608. In some embodiments, base section 500 (or 600) can be made from a suitable metal such as aluminum; any other suitable material like plastic, composite materials, glass, etc. can also be used.

The remote control device can also include a faceplate as discussed above. Referring again to FIGS. 4A and 4B, in an embodiment of the present invention, faceplate 404 can be coupled to the top surface of base section 402 such that an edge of faceplate 404 can be flush with or extend slightly above a top edge of peripheral structure 450. In some embodiments, faceplate 404 can be touch-sensitive, such that a user can touch the surface of faceplate 404 at designated locations to send a signal to the PMD. In some embodiments, faceplate 404 can include one or more markings 412. Markings 412 can provide visual indications of locations on the surface of faceplate 404 that a user can touch to activate an associated control function. In some embodiments, faceplate 404 can be made of a suitable metal such as aluminum; any other suitable material like plastic, composite materials, glass, etc. can also be used.

As discussed above, faceplate 404 can be touch-sensitive. In some embodiments, the touch sensors can be directly integrated into faceplate 404 thereby forming a touch-sensitive faceplate. In some embodiments, the entire faceplate 404 can be touch-sensitive. In other embodiments, selected portions of faceplate 404 can be made touch-sensitive. In some embodiments, the touch sensors can be located in specific area of faceplate 404 in order to form distinct buttons on the surface of faceplate 404. For example, markings 412 can coincide with such buttons.

Faceplate 404 can be electrically coupled to the electronic circuitry in base section 402 so that a tactile input received by faceplate 404 can be transmitted to the electronic circuitry for interpretation and further processing. For example, if the user touches faceplate 404 at the location where the marking 412 for "play" is present, faceplate 404 can send information about the location where the user touched to the electronic circuitry of the remote control device. The electronic circuitry can interpret the information and determine that the user wants to play the selected media item on the PMD. Thereafter, the transmitter in base section 402 can send an appropriate signal to the PMD. The PMD can interpret the signal and perform an action based on the signal.

Figure 7:
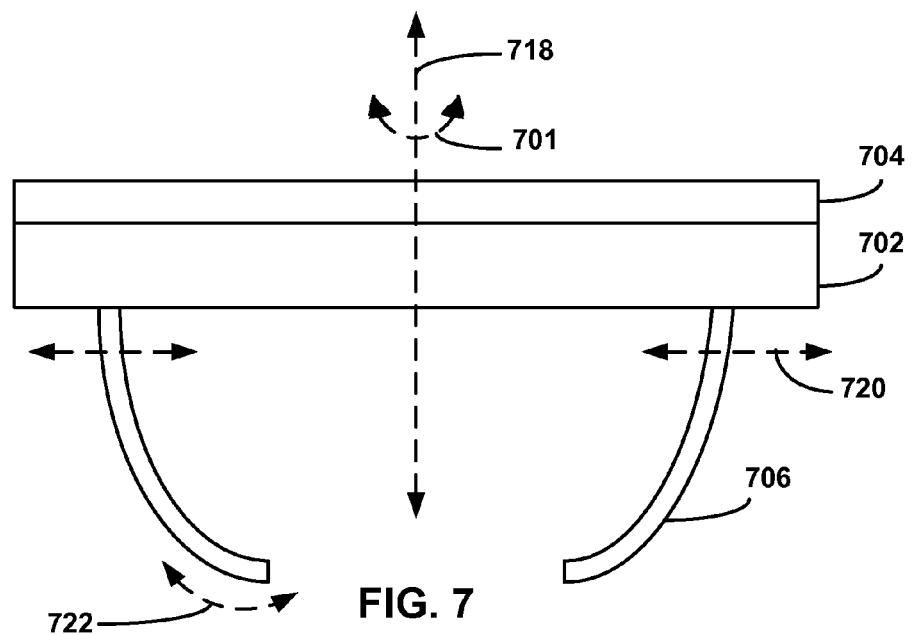
FIG. 7 is a side view of a remote control device illustrating the various axes of motion according to an embodiment of the present invention.

In some embodiments, faceplate 404 can be configured to rotate relative to base section 402. FIG. 7 illustrates a side view of the remote control device according to an embodiment of the present invention. In some embodiments, faceplate 704 can rotate (arrow 701) about an axis 718 that can be orthogonal to a center of a plane occupied by faceplate 704. Thus, faceplate 704 can be oriented in any manner along the rotational path regardless of the location of the remote control device on the steering wheel.

FIGS. 8A and 8B illustrate an example of how the faceplate can be rotated according to an embodiment of the present invention. As illustrated in FIGS. 8A and 8B, faceplate 804 can be rotated to orient the markings on faceplate in any direction relative to the base section. In FIG. 8A, the "MENU" marking on faceplate 804 is oriented parallel to arrow N while in FIG. 8B, the "MENU" marking is oriented at an angle to arrow N. It is to be noted that the orientation of the base section and clamping feet, relative to arrow N, are the same in FIGS. 8A and 8B. In some embodiments, faceplate 804 can either be rotated in a clockwise direction or in an anticlockwise direction. In some embodiments, faceplate can rotate through a 360 degree angle or more. In other embodiments, the rotation can be limited, e.g., to +−180 degrees from a centered starting position.

Referring back to FIGS. 4A and 4B, in some embodiments, faceplate 404 can be divided into multiple sections. For example, faceplate 404 can have an outer section 414 and an inner section 416. In this instance, markings 412 can be disposed on outer section 414. In some embodiments, outer section 414 can be rotatable relative to base section 404 as described above and inner section 416 can be fixed. In such an instance, inner section 416 can be depressible and/or touch-sensitive and can be used to confirm selection of an item after the item is selected using outer section 414. In one embodiment, faceplate 404 can provide a look and feel similar to the "click wheel" interface provided in certain iPod® line of portable media players manufactured by Apple Inc.

The remote control device can further include clamping feet for mounting the remote control device onto a steering wheel. The clamping feet can be moved to clamp onto or unclamp from a steering wheel. For purposes of this description, a clamping operation can be the one in which clamping feet move closer to each other in the arcuate direction so as to grip a steering wheel and an unclamping operation can be one in which clamping feet move apart from each other in the arcuate direction so as to release the grip on the steering wheel. Referring back to FIGS. 4A and 4B, clamping feet 406 can be attached at one end to the lower face of base section 402, e.g., using one or more hinges 410, and extend in a vertical direction from base section 402. In some embodiments, hinges 410 can be connected to a track 451 disposed in base section 402. Hinges 410 can allow clamping feet 406 to move in an arcuate orientation. Clamping feet can also be moved in a lateral direction by moving hinges 410. In some embodiments, clamping feet 406 and hinges 410 can be made of a suitable metal such as aluminum; any other suitable material like plastic, composite materials, fiberglass, etc. can also be used.

As described above, clamping feet 406 can be moved in an arcuate direction. FIG. 7 illustrates the arcuate motion of clamping feet 706 according to an embodiment of the present invention. As illustrated in FIG. 7, clamping feet 706 can move in an arcuate motion along the direction 722. The arcuate motion of clamping feet 706 can allow the remote control device to grip a steering wheel or un-grip the steering wheel. In other words, arcuate motion along direction 722 can result in a clamping or an unclamping operation.

FIGS. 9A and 9B illustrate the arcuate motion of clamping feet 902 during a clamping and an unclamping operation, respectively, according to an embodiment of the present invention. As illustrated in FIG. 9A, clamping feet 902 can be closer to each other in order to grip steering wheel 904. In FIG. 9B, clamping feet 902 can be farther apart from each other to release the grip on steering wheel 904. In order to either clamp the remote control device to steering wheel 904 or unclamp the remote control device from steering wheel 904, clamping feet 902 can move in an arcuate direction (arrow 922). Hinges 906 can enable clamping feet 902 to move in the arcuate direction. For instance, in order to clamp the remote control device around steering wheel 904, clamping feet 902 can move in arcuate direction (arrow 922) closer to each other, e.g., as illustrated in FIG. 9A. For unclamping the remote control device from steering wheel 904, clamping feet 902 can move away from each other in the arcuate direction, e.g., as illustrated in FIG. 9B.

As discussed above, the clamping feet can also be moved in a lateral direction, e.g., by moving the hinges. Referring back to FIG. 7, clamping feet 706 can be movable in a lateral direction 720 by moving the hinges along the bottom surface of base section 702. In some embodiments, the hinges can be moved laterally along a track, e.g., track 451 of FIG. 4A. In some embodiments, motion of the hinges along the lateral direction 720 can allow the remote control device to accommodate various thicknesses of steering wheels.

Figure 10A:
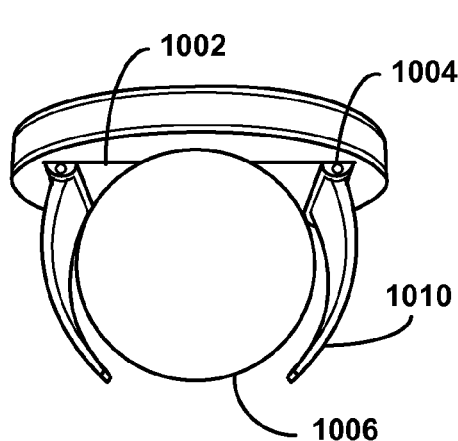
FIGS. 10A and 10B illustrate movement of hinges on the remote control device to accommodate different thicknesses of steering wheels according to an embodiment of the present invention.
Figure 10B:
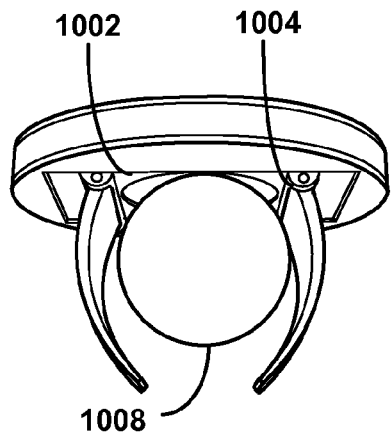

FIGS. 10A and 10B illustrate a remote control device accommodating steering wheels of two different thicknesses according to an embodiment of the present invention. As illustrated in FIG. 10A, hinges 1004 can be located at either end of track 1002 resulting in a maximum pitch between clamping feet 1010. As a result, the remote control device can accommodate steering wheel 1006 having a first thickness. When the remote control device is to be mounted on steering wheel 1008 having a second thickness that is less than the first thickness, hinges 1004 can be moved closer to each other laterally along track 1002 to accommodate the thinner steering wheel 1008 as illustrated in FIG. 10B. In some embodiments, the lateral movement of hinges 1004 can be achieved in a purely mechanical manner.

Referring back to FIGS. 4A and 4B, in some embodiments, the remote control device can also include one or more actuators 408. In some embodiments, actuators 408 can be disposed on each clamping foot. In other embodiments, a single actuator 408 can be disposed on a single clamping foot and can control movement of all clamping feet. Actuator 408 can be a button that can be depressed to activate arcuate motion of clamping feet 406. In some embodiments, actuator 408 can be a dial, switch, or any other user operable control. In some embodiments, actuator 408 can be coupled to a drive mechanism (not shown). When actuator 408 is activated, it can signal the drive mechanism to either initiate a clamping operation or an unclamping operation. In other words, activation of actuator 408 can result in an arcuate motion of the clamping feet. For instance, activating actuator 408 once can result in activation of the drive mechanism that can move clamping feet 406 closer to each other in an arcuate direction to perform a clamping operation. Activating actuator 408 again, when the remote control device is in a "clamped" state, can result in the drive mechanism moving clamping feet 406 apart in the arcuate direction to "unclamp" the remote control device. Thus, activation of actuator 408 can result in clamping feet toggling between the "clamped" and the "unclamped" state.

In some embodiments, the clamping and unclamping operations can be purely mechanical. For example, activating actuator 408 can result in a spring being engaged or released resulting in clamping feet 406 moving either towards each other or farther from each other. In other embodiments, the clamping and unclamping operations can be performed by a electrically powered drive mechanism. Any suitable drive mechanism can be adapted to provide this function.

Figure 11:
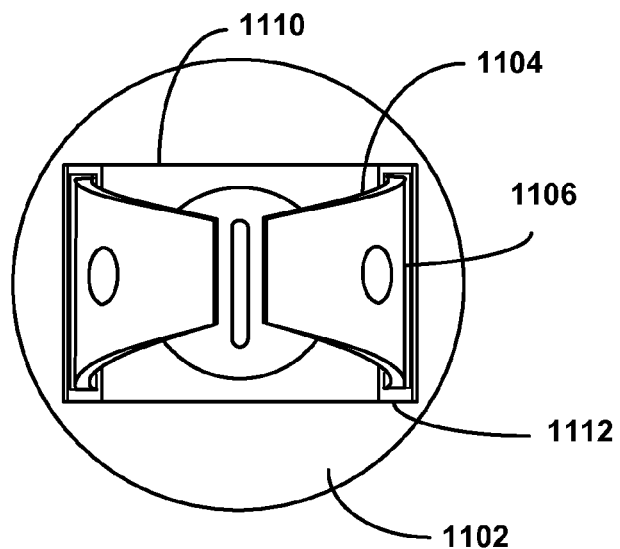
FIG. 11 illustrates a bottom view of the remote control device according to an embodiment of the present invention.

FIG. 11 illustrates a bottom view of the remote control device according to an embodiment of the present invention. Track 1110 can be attached to or formed within lower surface 1102 of the base section. Clamping feet 1104 can be attached to track 1110 via hinges 1112. One or more actuators 1106, e.g., buttons, can be disposed on clamping feet 1104.

Figure 12:
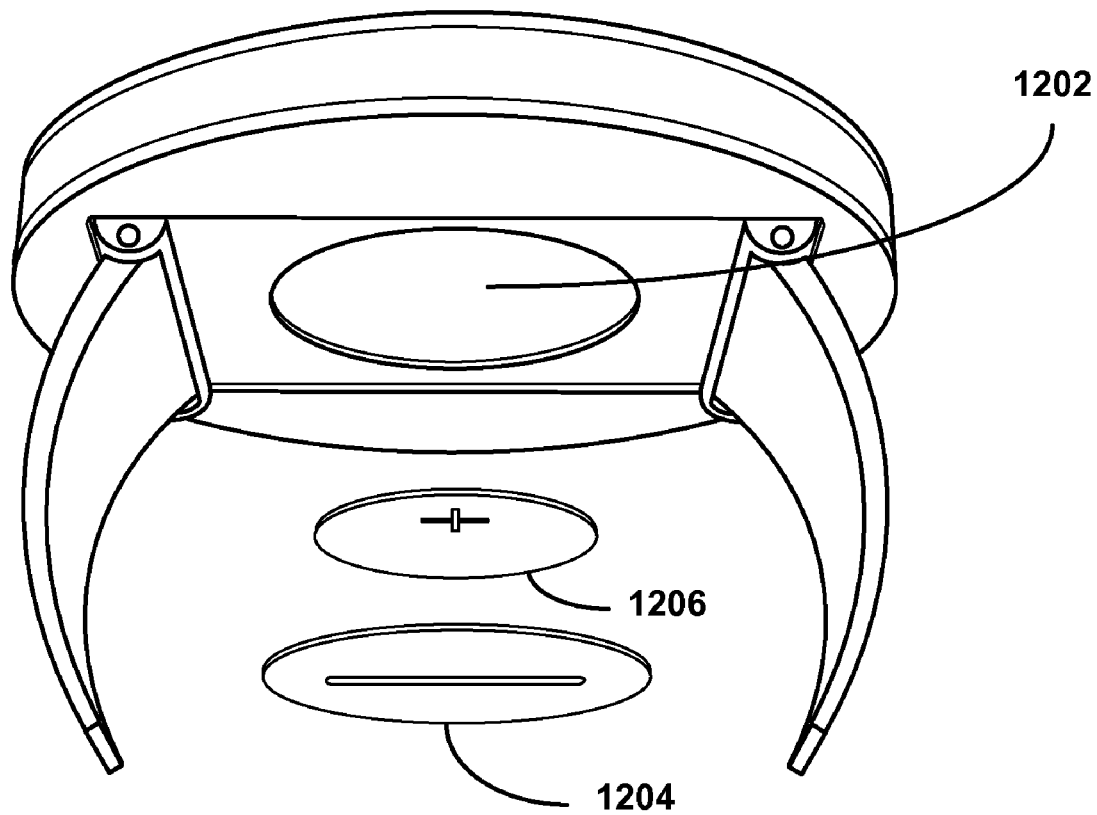
FIG. 12 is a bottom perspective of the remote control device according to an embodiment of the present invention.

FIG. 12 illustrates a bottom perspective of the remote control device according to an embodiment of the present invention. Cover plate 1204 can provide access to the base section via opening 1202 for, e.g., installing a battery (or other power source) 1206 within the base section or replacing any components located in the base section.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A remote control device for a portable media device, the remote control device comprising:
 a base section including electronic circuitry for operation of the remote control device, the base section having an upper face and an opposing lower face;
 a faceplate rotatably coupled to the upper face of the base section, wherein the faceplate is configured to rotate about an axis orthogonal to a center of a plane occupied by the faceplate; and
 a clamping mechanism including a plurality of feet, each of the feet having a first end and a second end, wherein each of the feet is attached to the lower face of the base section at the first end and extending to a first distance substantially perpendicular to the lower face,
 wherein the first end of each of the feet is configured to move laterally along the lower face and the second end of each of the feet is configured to move in an arcuate orientation relative to the axis.

2. The remote control device of claim 1, wherein the remote control device is configured to communicate with the portable media device using a wireless communication channel.

3. The remote control device of claim 2, wherein the wireless communication channel is a Bluetooth channel.

4. The remote control device of claim 1, wherein the base section further includes a power source configured to provide power to the electronic circuitry.

5. The remote control device of claim 4, wherein the power source is further configured to assist in the operation of the clamping mechanism.

6. The remote control device of claim 1, wherein the faceplate is coupled to a plurality of touch-sensitive sensors configured to interpret user input.

7. The remote control device of claim 1, wherein the faceplate is configured to rotate in a 360 degree angle in a clockwise direction or an anti-clockwise direction.

8. The remote control device of claim 1, wherein the clamping mechanism further comprises an actuating mechanism for actuating the plurality of support feet.

9. The remote control device of claim 8, wherein the actuating mechanism comprises a button.

10. A wireless remote control device for mounting on a steering wheel of a vehicle, the remote control device comprising:
 a base section having a back face and including:
  a peripheral structure connected to the back face and having a first height, the peripheral structure defining a chamber;
  a touch-sensitive faceplate rotatably coupled to the peripheral structure; and
  a wireless transmitter adapted to transmit signals to a portable media device in response to detected touching of the touch-sensitive faceplate;
 a clamping mechanism comprising:
  at least two opposing clamping feet attached to the back face of the base section, wherein each of the clamping feet is configured to move in a lateral direction parallel to and along the back face and in an arcuate direction relative to the back face; and
  an actuator configured to initiate a clamping process and an unclamping process.

11. The remote control device of claim 10, wherein the base section and the faceplate are circular in shape.

12. The remote control device of claim 10, wherein the remote control device is wearable on a person.

13. The remote control device of claim 10, wherein the each of the clamping feet is attached via a hinge to a track disposed on the back face of the base section, wherein the hinges are movable in a lateral direction along the track.

14. The remote control device of claim 10, wherein the faceplate is rotatable, relative to the back face of the base section, about an axis that is orthogonal to a center of a plane occupied by the faceplate.

15. A remote control device comprising:
a base section including a back face and a peripheral structure having a first height attached to the back face, the back face in conjunction with the peripheral structure defining a chamber;
electronic circuitry disposed in the chamber;
a touch-sensitive faceplate rotatably coupled to the peripheral structure and disposed over the electronic circuitry; and
a plurality of clamping feet attached to the back face; wherein the plurality of clamping feet are configured to move in a lateral direction along the back face and in an arcuate direction relative to an axis orthogonal to a center of a plane occupied by the faceplate.

16. The remote control device of claim 15, wherein the faceplate is electrically coupled to the electronic circuitry.

17. A wireless remote control device comprising:
a base plate and a plurality of retaining structures attached to the base plate, wherein the base plate and the plurality of retaining structures define an opening bounded by the plurality of retaining structures;
a faceplate unit rotatably disposed in the opening, wherein the faceplate unit comprises:
a bottom surface and a peripheral structure attached to the bottom surface;
a touch-sensitive faceplate coupled to the peripheral structure thereby forming a chamber; and
a wireless transmitter disposed in the chamber;
a plurality of clamping feet attached to the base plate; and
an actuator configured to initiate movement of at least one clamping foot from among the plurality of clamping feet.

18. The wireless remote control device of claim 17, wherein the faceplate unit is configured to rotate in an angle of up to 360 degrees within the opening.

19. The wireless remote control device of claim 17, wherein the plurality of clamping feet are configured to move in an arcuate direction relative to an axis perpendicular to center to a plane occupied by the faceplate and further configured to move in a lateral direction along the base plate.

* * * * *